United States Patent [19]
Hulslander

[11] 3,806,087
[45] Apr. 23, 1974

[54] PLUG VALVE CONSTRUCTION
[75] Inventor: William L. Hulslander, Bradford, Pa.
[73] Assignee: Dresser Industries, Inc., Dallas, Tex.
[22] Filed: July 5, 1972
[21] Appl. No.: 268,982

[52] U.S. Cl............. 251/309, 251/315, 29/157.1 R
[51] Int. Cl............................................... F16k 5/00
[58] Field of Search......... 251/309, 315; 29/157.1 R

[56] References Cited
UNITED STATES PATENTS

| | | | |
|---|---|---|---|
| 3,038,694 | 6/1962 | Dunbeck et al. | 251/309 X |
| 3,415,299 | 12/1968 | Hinman, Jr. et al. | 251/309 UX |
| 3,481,367 | 12/1969 | Deuschle | 251/368 X |
| 3,360,236 | 12/1967 | Hulsander | 251/309 X |
| 3,314,644 | 4/1967 | Dwyer et al. | 251/309 |
| 3,467,356 | 9/1969 | Mueller | 251/309 X |
| 3,532,117 | 10/1970 | Racki | 251/309 X |

Primary Examiner—William R. Cline
Assistant Examiner—Ira S. Lazarus
Attorney, Agent, or Firm—Daniel Rubin

[57] ABSTRACT

A rotatable operating plug for opening and closing the fluid flow passage in the body of a plug valve. The plug is conically tapered of cast construction and includes a thru port for alignment with the body flow passage in the open position. To accurately and consistently control manufacturing tolerances in dimensionally critical areas, plug casting is effected with a controlled parting line located on the widest surface segment. The segment is functionally non-cooperative with the opposite body surface and the parting line thereon extends in a direction normal to the longitudinal axis of plug rotation.

12 Claims, 11 Drawing Figures

PLUG VALVE CONSTRUCTION

CROSS-REFERENCE TO RELATED APPLICATIONS

Application Ser. No. 227,475, filed Feb. 18, 1972, entitled "Plug Valve Seal" now U.S. Pat. No. 3,765,646.

BACKGROUND OF THE INVENTION

1. The art to which the invention pertains includes the art of plug valves utilized in a piping system for controlling flow of fluid line contents.

2. Plug valves having a tapered plug rotatably operable in a conical body well are well known in the art. A commercial form of such valves employing a floating closure seal interposed between the rotatable plug and well wall is disclosed in U.S. Pat. No. 3,360,236. Typically, a biasing member such as the spring or the like forces the plug axially downward into the well in order to obtain close conical interfit between opposing surfaces for effecting operation in the manner intended.

The plug itself is manufactured as a separate component for closely positioned placement in the assembled valve. For purposes of regulating flow, the otherwise solid plug includes a lateral thru port alignable with the body passage and for preventing unwanted leakage past the valve in its closed position includes peripherally displaced recesses to accommodate suitable seal members. On a production basis such plugs are customarily cast of cast iron or the like chemically compatible with the line content with which it is to be used. Because of the directionally offset thru port and seal recesses to be accommodated, the practice has been to cast the plug with the parting line peripherally extending along the longitudinal axis of the plug. While theoretically sound, the inability to adequately control casting variables of swell, shift and the like associated with the parting line in this location has produced inaccuracies and inconsistencies in dimensionally critical areas where in fact close manufacturing tolerances are required for proper fit and operation. In this connection it should be appreciated that valve performance and general reliability requires a closely cooperating assembled interfit between the plug and body well without which valve performance is seriously jeopardized. Moreover, code requirements, established by various regulating agencies, set out minimum operational standards for such valves, that, if not met, render the valves commercially unsuitable or at least unsuitable for service carrying combustible commodities such as natural gas. As a consequence, these difficulties have led to disproportionate manufacturing costs from a variety of factors including high scrap rate, high inspection costs and high finishing costs in order to insure a dependable end product. Despite recognition of the foregoing, it has not been known heretofore how to readily resolve these difficulties in an economical manner.

SUMMARY OF THE INVENTION

The invention relates to a plug valve and more particularly to a novel plug construction therefor. While still cast and affording the thru port and seal recesses previously utilized, the plug in accordance herewith is cast with a controlled parting line located on a functionally non-cooperative surface segment whereby to eliminate all the previous difficulties associated therewith. Rather than a longitudinal parting line of a type previously produced, the parting line hereof extends in a direction normal to the longitudinal axis of rotation on the widest surface segment defined by a juncture intermediate the tapered body and the integral drive shank. By controlling location of the parting line in this manner, the resulting swell or shift is held to an absolute minimum while its effects can be readily tolerated by virtue of its functionally non-cooperating relation with the adjacent body surfaces. This has resulted in substantially improved dimensional accuracies and consistencies compared to such prior art construction contributing to significant reductions in the overall manufacturing cost of such valves.

It is therefore an object of the invention to provide a novel plug valve construction.

It is a further object of the invention to provide a novel construction of the rotatable operating plug utilized for opening and closing the fluid passages in the body of a plug valve.

It is a further object of the invention to provide a novel plug construction as in the last recited object able to eliminate adversities associated with parting lines in previous casting of such plugs.

It is a further object of the invention to achieve the aforementioned objects in a highly economical manner contributing to significant reduction in the overall manufacturing costs of such valves.

It is a still further object of the invention to provide a novel method for forming the plug of the aforementioned objects.

Figure 1:
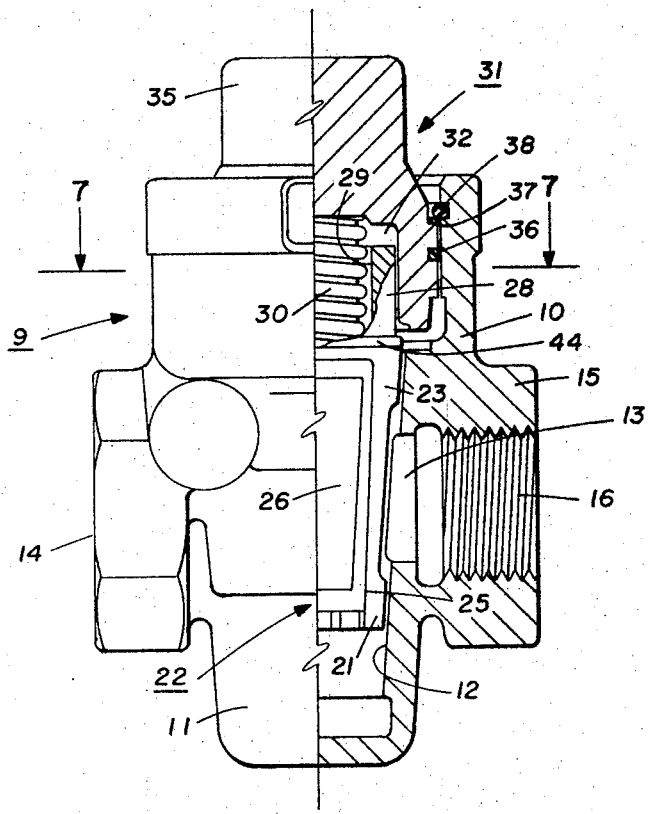
FIG. 1 is a plug valve partially in section constructed in accordance with the invention.
Figure 3:
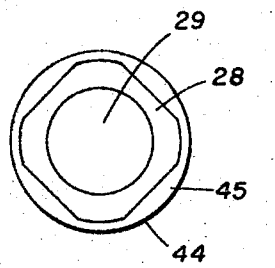
FIG. 3 is a top plan view of the plug.

Referring now to the drawings and initially to FIG. 1, the valve is comprised of a body or casing 9 including an upper cylindrical part 10 to which is integrally joined a lower conical well 11 providing a tapered bore 12. Transversely communicating with wellbore 12 from opposite sides are a pair of ports 13 and 14 one of which comprises the inlet port and the other of which comprises the outlet port depending on the direction of flow as ultimately utilized in service. Associated with each of the ports is a boss 15 and an internal thread 16 for receiving the threaded end of a connecting pipe. Boss 15 is ordinarily of hexagonal shape for wrench engaging purposes.

Figure 2:
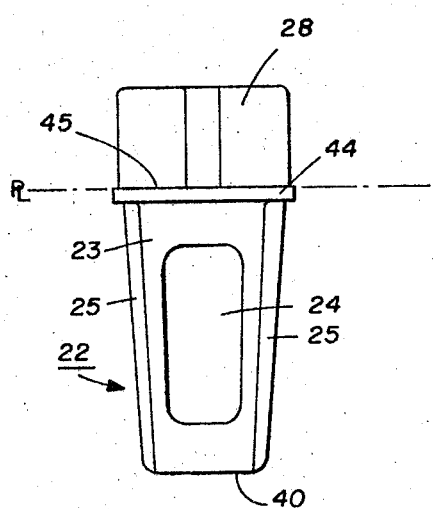
FIG. 2 is an elevation of the plug viewed in line with the thru port passage.

Extending into well bore 12 is a plug 22, in accordance herewith, generally comprising a lower main body portion 23 of conical contour complemental to the taper of well bore 12 with which it is to cooperate. Extending laterally through the otherwise solid main body portion is a transverse passage or thru port 24 (FIG. 2) adapted for alignment with ports 13 and 14 when the valve is in its open position. Displaced substantially 90° from the axis of the thru port and disposed in the periphery therebetween are a pair of circumferential and axially elongated shallow recesses 25. Seated in each of the recesses for a floating relation with the plug in the manner disclosed in U.S. Pat. No. 3,360,236 is a closure or sealing element 26 which may, for example, be of a type disclosed in the copending application cross-referenced above.

Integrally formed with body portion 23 and extending upward therefrom is a shank section 28 of generally square periphery. The shank includes a central recess 29 in which to receive a coil spring 30 compressed therein by means of a turning nut 31 having a central socket 32 for a complementary close mounted overfit onto the periphery of shank 28. Nut top 35 extends outward of the valve body and includes wrench engaging flats for rotating the plug between its operating positions. O-ring seal 36 provides packing against leakage while annular bearing ring 37 underlying retaining ring 38 provides a bearing surface for eased rotation of the plug.

Figure 5:
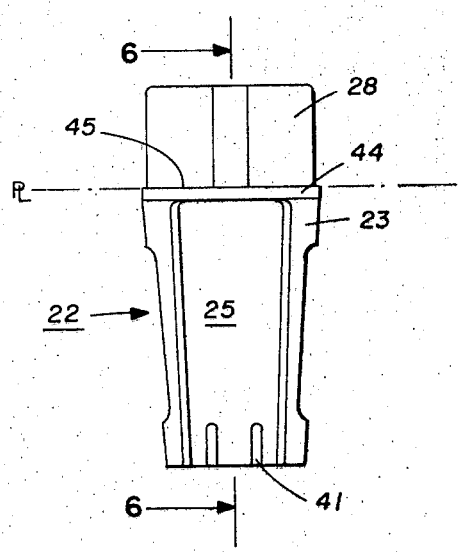
FIG. 5 is an elevation of the plug viewed 90° displaced from that of FIG. 2.
Figure 4:
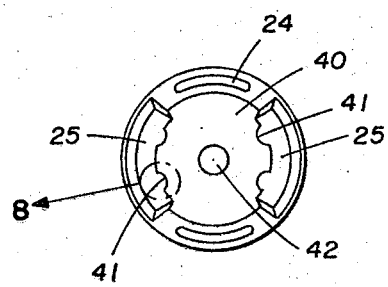
FIG. 4 is a bottom underside plan view of the plug.

Formed within the confines of recess 25 at the lower terminal end 40 of body portion 23 are a plurality of pressure slots or passages 41 (FIGS. 4 and 5). The passages serve a function conventional in the art by which leakage intentionally permitted past the inlet seal member 26 is communicated to the backside of the corresponding outlet seal. This enables line pressure to be exerted against the backside of the latter for enhancing sealing thereof. Conical recess 42 on the plug underside defines a cast gaging center for quality control inspection of plug concentricity.

Figure 10:
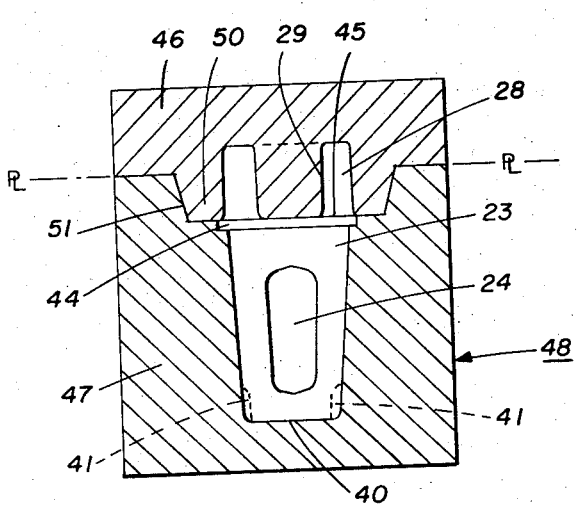
FIG. 10 is a sectional view through the mold for casting the plug.
Figure 7:
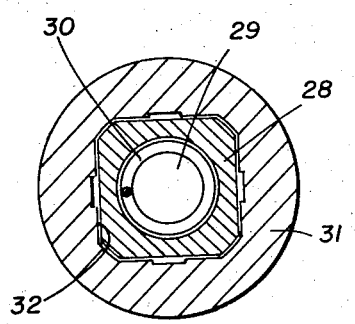
FIG. 7 is a sectional view taken substantially along the lines 7—7 of FIG. 1.

For constructing plug 22 in accordance herewith, the upper end of conical body 23 terminates against an annular flange 44 forming the juncture with shank 28. The flange comprises the surface segment of largest diameter and which otherwise lacks any cooperating function with the surrounding or radially adjacent elements of the assembled valve. Because of its being relatively devoid functionally, top flange surface 45 as corresponding in the mold cavity is utilized as the parting line PL between cope 46 and drag 47 of shell mold 48 illustrated in FIG. 10. Continuous draft is therefore provided longitudinally in both directions from the parting line to enable trouble free pattern removal from the mold.

Figure 11:
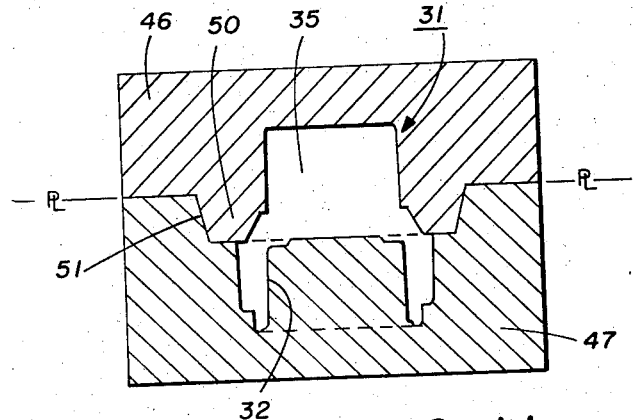
FIG. 11 is a sectional view through the mold for casting the plug turning nut.
Figure 6:
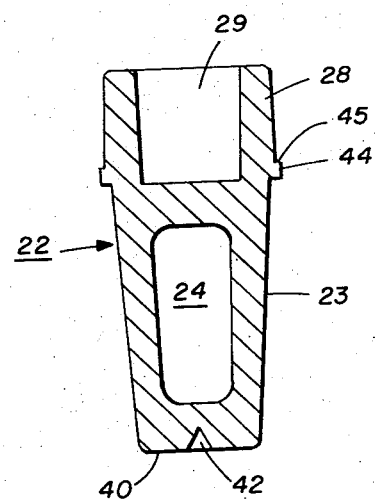
FIG. 6 is a sectional view taken substantially along the lines 6—6 of FIG. 5.
Figure 9:
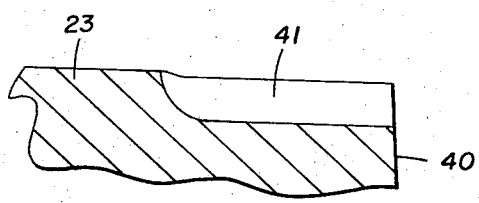
FIG. 9 is a sectional view taken substantially along the lines 9—9 of FIG. 8.
Figure 8:
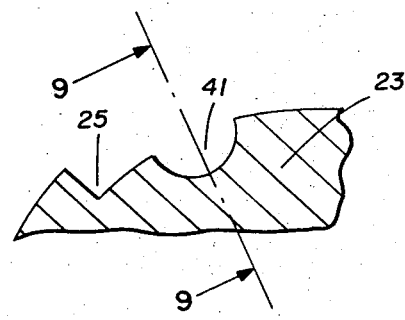
FIG. 8 is a fragmentary enlargement of the encircled portion of FIG. 4.

In order to insure concentricity of shank 28 with body portion 23, the parting line in cope 46 conically protrudes locally downward about the shank cavity at 50 for aligned receipt in a conical drag recess locally about the body cavity at 51 whereby the elements are self-centering as the mold is closed. By virtue of the provided draft, the conical angle afforded to the plug becomes a fixed dimension determined by the mold pattern and is otherwise not subject to variables associated with the parting line as in the prior art. Turning nut 31 is similarly cast as illustrated in FIG. 11 for effecting accurate control over dimensions of socket 32. This reduces free play when mounted on shank 28 and assures accurate plug positioning as determined from exterior viewed angular orientation of the turning nut. That is, the viewed angular position of the nut by this arrangement accurately reflects angular orientation of the plug internally of the valve.

By the above description there is disclosed a novel construction for the rotatable operator plug utilized for the control of fluid flow through a plug valve body. By restricting location of the parting line to a relatively innocuous control surface segment of the plug at the juncture intermediate the body and shank, previous problems associated with parting lines in similar purpose plugs of the prior art are substantially, if not completely, eliminated. Not only is dimensional accuracy and consistency significantly enhanced by this technique, but as a result both operating performance and cost of manufacturing these valves are very favorably affected. Such a result has thereby resolved a problem long-standing and desired by industry. It is recognized, of course, that parting lines can be eliminated from the finished product by grinding or the like and therefore for purposes hereof is regarded as existing even on those end products from which it was intentionally removed subsequent to casting.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a plug valve including a body member defining a fluid passage between ports for the inlet and outlet of fluid flow and a conical well defined extending into said body passage intermediate said ports, and an encapsulated cast plug member extending within said body well and rotatably operable from a first position in which said passage is open between said ports to a second position in which said passage is closed between said ports, the improvement comprising said plug having:
    a. a substantially as-cast lower body portion conically tapered for extending into the well of said valve body,
    b. an upper shank portion integrally connected with said body portion and adapted to receive application of turning torque for rotating said plug; and
    c. a parting line on the plug periphery restrictively located on a surface segment thereof relatively devoid of functional cooperation with the adjacent wall surfaces of said well.

2. The improvement according to claim 1 in which the said adjacent wall surfaces comprise the surfaces thereof radially opposite said surface segment.

3. The improvement according to claim 2 in which said parting line extends on said surface segment generally normal to the longitudinal axis of said plug.

4. The improvement according to claim 3 in which said surface segment comprises the juncture of said lower body portion and said shank portion.

5. The improvement according to claim 4 in which said juncture on which said parting line is located includes an annular flange intermediate said lower body portion and said shank portion.

6. The improvement according to claim 5 in which said flange includes the dimensionally largest width throughout the entire longitudinal extent of said plug.

7. The improvement according to claim 6 in which said upper shank portion defines a central recess extending coaxially inward toward said flange and there is included spring means within said central shank recess urging the plug into said well.

8. The improvement according to claim 7 in which the axially extending periphery of said shank generally surrounding said central recess if of substantially square configuration.

9. In the method of casting a tapered plug adapted to be encapsulated for rotatable service in the conical well of a plug valve body in which said plug is comprised of a substantially as-cast lower body portion conically tapered for extending into the well of said valve body, and an upper shank portion integral with said body portion and adapted to receive application of turning torque for being rotated within the body well, the improvement comprising the step of restrictively locating the casting parting line on a surface segment of the plug periphery adapted to be relatively devoid of functional cooperation with radially opposite surfaces of the well.

10. The improvement according to claim 9 in which said parting line is located on said surface segment extending generally normal to the longitudinal axis of the plug.

11. The improvement according to claim 10 in which said surface segment comprises the juncture of said lower body portion and said shank portion.

12. The improvement according to claim 11 in which said juncture on which said parting line is located includes an annular flange intermediate said lower body portion and said shank portion.

* * * * *